April 2, 1968 K. C. MERRELL 3,376,431

CONTINUOUS ACTING CURRENT INTEGRATOR HAVING SELECTIVE ZERO BASE AND PROVIDING VARIABLE REPETITION RATE OUTPUT PULSES OF PREDETERMINED WIDTH AND AMPLITUDE

Filed July 2, 1965 2 Sheets-Sheet 1

INVENTOR
Kenneth C. Merrell

BY Birch & Birch
ATTORNEYS

CONTINUOUS ACTING CURRENT INTEGRATOR HAVING SELECTIVE ZERO BASE AND PROVIDING VARIABLE REPETITION RATE OUTPUT PULSES OF PREDETERMINED WIDTH AND AMPLITUDE

Filed July 2, 1965 2 Sheets-Sheet 2

INVENTOR
Kenneth C. Merrell
BY Birch & Birch
ATTORNEYS

United States Patent Office 3,376,431

Patented Apr. 2, 1968

3,376,431

CONTINUOUS ACTING CURRENT INTEGRATOR HAVING SELECTIVE ZERO BASE AND PROVIDING VARIABLE REPETITION RATE OUTPUT PULSES OF PREDETERMINED WIDTH AND AMPLITUDE

Kenneth C. Merrell, Brea, Calif., assignor to Robertshaw Controls Company, Richmond, Va., a corporation of Delaware Filed July 2, 1965, Ser. No. 469,255
27 Claims. (Cl. 307—229)

ABSTRACT OF THE DISCLOSURE

A continuous acting current integrator circuit is provided which generates an output pulse of predetermined width and amplitude for a given quantum of input current, the circuit including a suppression current generating network for selectively establishing a zero level of current input by opposing the input current, a selectively variable reference voltage network for controlling the current generating network, and a charging current network for charging an input capacitance, at a rate proportional to the magnitude of the input current, to predetermined reset voltage level, at which level the circuit generates an output pulse and resets the input capacitance to zero, to commence another charging cycle.

This invention relates to direct current integrating means and more particularly to an integrating circuit means providing an output pulse in response to a preselected quantum of input current.

It is an object of this invention to provide a new and novel continuous acting current integrator circuit having a quantized pulse output readily adaptable for directly driving a totalizer readout register or the like.

Another object of this invention is to provide a new and novel all electronic continuous acting current integrator.

Still another object of this invention is to provide a new and novel continuous acting current integrator means which is accurate in operation.

Still another object of this invention is to provide a new and novel solid state current integrator which is insensitive to power supply and ambient temperature variations.

Still another object of this invention is to provide a new and novel current integrator circuit which produces quantized output pulse signals of constant height and width having a repetition frequency proportional to the amplitude of a direct current signal.

Still another object of this invention is to provide a new and novel current integrator circuit wherein accurate integration of non-zero based D.C. current signals is effected.

Yet another object of this invention is to provide a new and novel continuous acting current integrator having novel suppression means at the input thereof selectively providing a zero base for direct current input signals.

These and other objects of this invention will become more fully apparent with reference to the following specification and drawings, which relate to two preferred embodiments of the invention.

Figure 1:
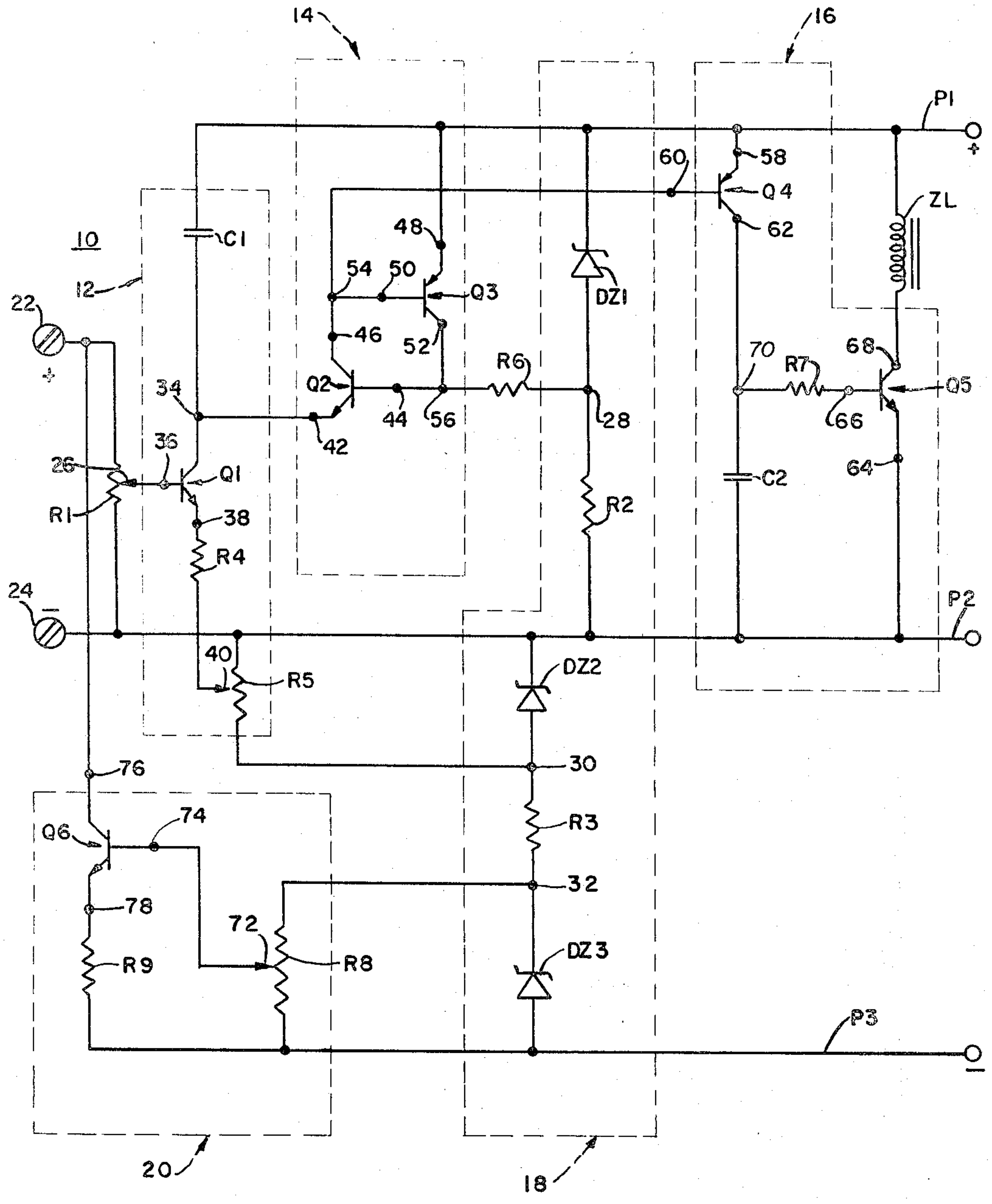
FIGURE 1 is a schematic circuit diagram of one emmodiment of the invention.

Referring in detail to the drawings and more particularly to FIGURE 1, the first embodiment of the invention will now be described.

The integrator circuit 10 includes a charging generator circuit 12, a bistable latching circuit 14, an output driver circuit 16, a voltage reference network 18 and an input suppression current generator 20.

The circuit 10 is further provided with positive and negative input terminals 22 and 24, respectively, across which is connected an input resistance R1 having a variable center tap 26 thereon. Direct current bias is provided to the circuit 10 via positive, common and negative power leads P1, P2 and P3, respectively, the common lead P2 including the negative input terminal 24.

The reference voltage network 18 comprises a first Zener diode $D_{Z1}$, connected at its cathode to the positive power lead P1, in series with a resistor R2 connected between a first reference node 28 at the anode of the said diode $D_{Z1}$ and the common power lead P2; and second and third Zener diodes $D_{Z2}$ and $D_{Z3}$, respectively, separated by a series resistor R3 at second and third reference nodes 30 and 32, respectively, and connected at their respective cathodes and anodes with the common and negative power leads P2 and P3.

The charging current generator 12 includes an input quantizing capacitance means C1 connected between the positive power lead P1 and the collector terminal 34 of a first transistor Q1 of the NPN type. The transistor Q1 includes a base terminal 36 directly connected to the center tap 26 on the input resistor R1 and an emitter terminal 38 connected through a bias resistance R4 to the center tap 40 of a variable voltage divider R5, the latter being connected between the common lead P2 and the second reference node 30 in the reference voltage network 18.

The bistable latching circuit 14 comprises second and third transistors Q2 and Q3 of the NPN and PNP types, respectively. The second transistor Q2 is provided with emitter, base and collector electrodes 42, 44 and 46, respectively. The third transistor Q3 is provided with emitter, base and collector electrodes 48, 50 and 52, respectively.

The collector 46 and base 50 of the second and third transistors Q2 and Q3, respectively, are commonly connected at a junction 54 comprising the output terminal of the bistable latching circuit 14.

The base 44 and collector 52 of the second and third transistors Q2 and Q3, respectively, are commonly connected at a junction 56 which, in turn, is connected through a resistance R6 with the first reference node 28 of the reference voltage network 18.

The emitters 42 and 48 of the second and third transistors Q2 and Q3 are respectively connected to the collector terminal 34 of the first transistor Q1 and the positive power lead P1.

The output driver stage 16 comprises fourth and fifth transistors Q4 and Q5, of the PNP and NPN type, respectively, the former having emitter, base and collector electrodes 58, 60 and 62, respectively, and the latter having emitter, base and collector electrodes 64, 66 and 68, respectively.

The fourth transistor Q4 has its emitter 58 connected with the positive power lead P1; its collector 62 connected through an output node 70 and a capacitor C2 to the common lead P2; and its base 60 directly connected with the output terminal 54 of the latching circuit 14.

The output node 70 is connected through a coupling resistance R7 with the base terminal 66 of the fifth transistor Q5, the latter having its emitter 64 connected directly with the common lead P2 and its collector 68 connected through a load impedance ZL to the positive power lead P1.

The input suppression current generator 20 comprises a variable ratio dropping resistance R8, connected between the third reference node 32 and the negative power lead P3, having a variable tap 72 thereof connected to the base terminal 74 of a sixth transistor Q6 of the NPN type, the latter having a collector terminal 76 connected with the positive input terminal 22 and an emitter terminal 78 connected through a bias resistance R9 to the negative power lead P3.

Figure 2:
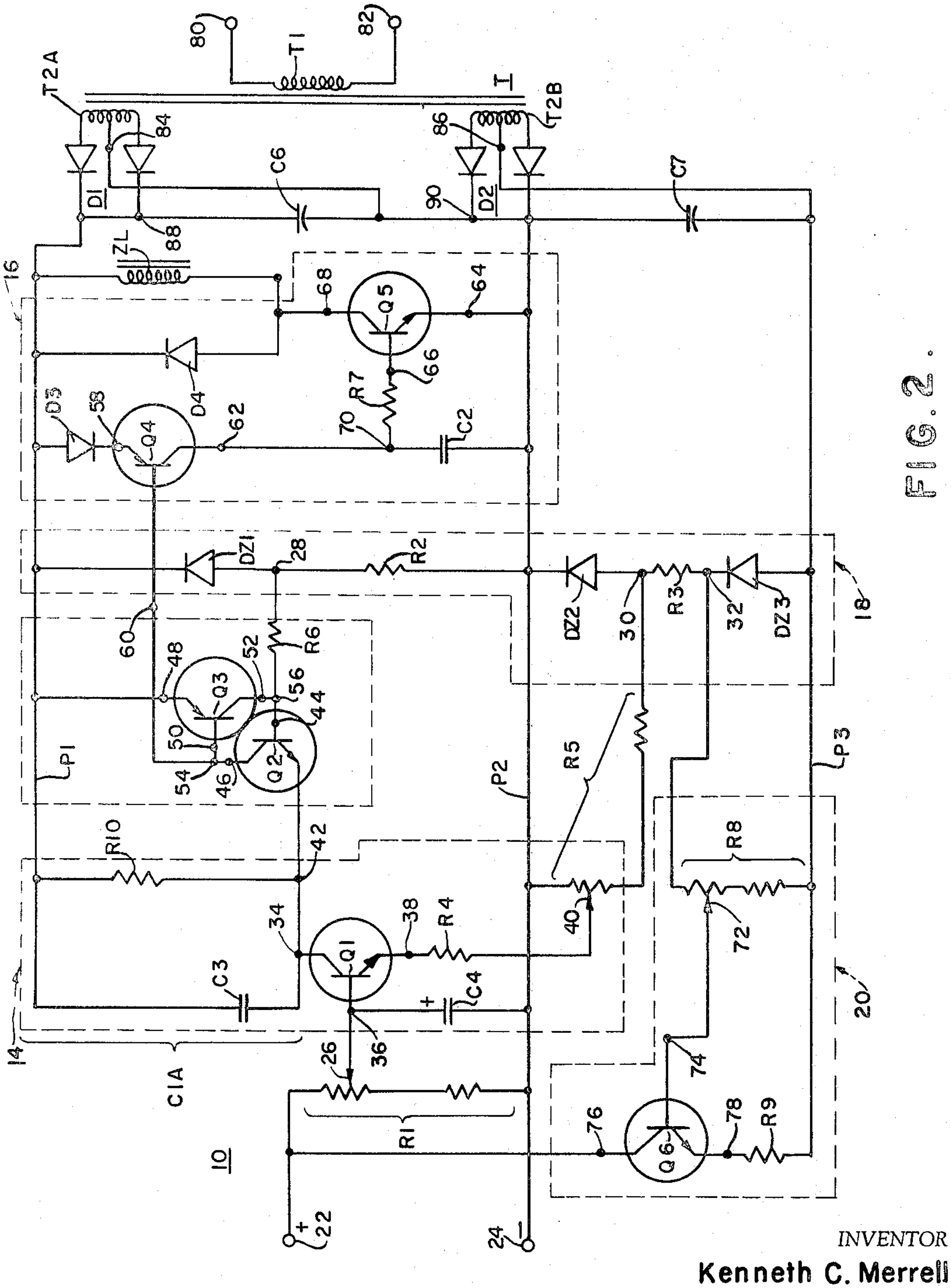
FIGURE 2 is a schematic circuit diagram of a second embodiment of the invention using alternating current energization of the power supply portion thereof.

Referring now to FIGURE 2, wherein like elements to the embodiment of FIGURE 1 bear like numerals, the second preferred embodiment of the integrator circuit 10 of the present invention, which utilizes A.C. to D.C. conversion from an A.C. power source will be described.

The quantizing capacitance means C1A is comprised of a capacitor C3 and a parallel resistance means R10 connected from the positive power lead P1 to the collector terminal 34 of the first transistor Q1. The resistance means R10 provides a direct current shunt path around the capacitor C3 allowing bias current to flow in the first transistor Q1, whereby the said first transistor Q1 is permitted to operate within the more linear portion of its base current vs. collector current characteristic curve.

A fourth capacitor C4 is connected from the base terminal 36 of the first transistor Q1 to the common lead P2, thus being connected in parallel with the input resistance R1 and comprising a low pass filter means for rejecting noise components in the input signal.

Alternating current power is applied, via power terminals 80 and 82 to the primary T1 of a power transformer T. A pair of secondary windings T2A and T2B are provided having center taps 84 and 86 connected, respectively, to the common lead P2 and negative power lead P3.

The secondary windings T2A and T2B feed, respectively, full wave rectifiers D1 and D2 which are connected at their respective output terminals 88 and 90 to the positive and common power leads P1 and P2, respectively.

A first filter capacitor C6 is connected between the output terminal 88 and center tap 84 of the transformer secondary T2A and consequently, across the positive and common power leads P1 and P2.

A second filter capacitor C7 is connected between the output terminal 90 and center tap 86 of the second transformer secondary T2B and consequently, across the common and negative power leads P2 and P3.

A diode D3 is connected in series between the positive power lead P1 and the emitter terminal 58, of the fourth transistor Q4 in the output driver stage 16, the cathode of the diode D3 being connected at the said emitter terminal 58.

A diode D4 is connected in parallel with the load impedance ZL with the anode thereof connected at the collector terminal 68 of the fifth transistor Q5 in the output driver stage 16.

OPERATION

Referring to FIGURE 1, the operation of the integrator circuit 10 of the present invention will now be described.

Assuming that D.C. power is applied to the leads P1, P2 and P3 as indicated and assuming the application of a direct current input flowing from the positive input terminal 22 to the negative input terminal 24 through the input resistor R1, this input current will produce a voltage at the variable tap 26 on the resistor R1 which is applied to the base terminal 36 of the first transistor Q1 in the charging generator circuit 12.

It is further assumed at this point that the variable tap 72 on the resistance R8 in the input suppression current generator 20 has been selectively adjusted to provide the proper zero base for the input current signal being monitored. The flow of current through the collector emitter path of the sixth transistor Q6 is determined as a function of the base bias voltage selected by the setting of the said variable tap 72 on the resistor R8, thereby setting up a preselected suppression current in the input resistance R1 in opposition to the input current therein.

The charging rate for the quantizing capacitance means C1 for a given input magnitude above the selected zero base is selectively adjusted by the positions of the variable taps 26 and 40 on the input and bias resistors R1 and R5, respectively.

The input voltage at the variable tap 26 applied to the base 36 of the first transistor Q1 causes this transistor to conduct and charge the quantizing capacitance means C1, at a rate proportional to the magnitude of the zero based input signal current, through the collector-emitter.

As the quantizing capacitance C1 charges an increasing voltage appears thereacross and the voltage at the collector terminal 34 is reduced.

Reduction in voltage at the point 34 increases the base-to-emitter bias of the third transistor Q3 in the latching circuit 14 causes same to conduct, whereby a simultaneous reduction in the voltage at the collector 46 thereof and output terminal 54 of the said latching circuit 14 is also effected.

The voltage reduction at the output terminal 54 is simultaneously reflected at the base terminal 60 of the fourth transistor Q4 in the output driver stage 16 and at the base terminal 50 of the third transistor Q3 in the bistable latching circuit 14, causing both the third and fourth transistors Q3 and Q4 to conduct by increasing the respective emitter-to-base bias thereof.

Conduction of the third or latching transistor Q3 provides a discharge path for the quantizing capacitance C1 via emitter 48, collector 52, terminal 56, resistor R6, first reference node 28 and resistor R2 to the common power lead P2. The resulting discharge current keeps the voltage at the terminal 56 and the base 44 of the second transistor Q2 at a sufficiently high value to latch the transistor Q2 in the conductive state until the quantizing capacitance C1 is discharged, the voltage thereacross thus being reset to zero each time a fully charged or quantum state thereof has been achieved.

Conduction of the fourth transistor Q4 in the output driver stage 16 provides a charging path for the capacitor C2 via the emitter and collector terminals 58 and 62, thereof, the latching of the third transistor Q3 being of a sufficient duration to maintain the fourth transistor Q4 conductive until a predetermined driving voltage has been established across the capacitor C2.

The capacitor C2 discharges through the coupling resistance R7 into the base terminal 66 of the fifth transistor Q5 to render the latter conductive and maintain same in that state fror a period of time determined by the time constant of the C2–R7 discharge path. Thus, the load impedance ZL is energized by a current pulse, having a pulse width determined by the said time constant of the C2–R7 discharge path, flowing from the positive power lead P1 through the load impedance ZL to the common lead P2 via the collector and emitter terminals 68 and 64, respectively, of the fifth transistor Q5.

The amplitude and width of the power pulse through the load impedance ZL provide a power level at the output of the integrator 10 sufficient to effect a direct electrical drive of an electromechanical pulse totalizing or counting register.

The operation above describes the cycle of operation for effecting a single output pulse with automatic reset of the input quantizing portion of the integrator 10. This cycle will continue to repeat as long as there is an input current signal flowing which has a magnitude greater than the selected zero base.

The operation of the embodiment of FIGURE 2 is substantially identical with that of the embodiment of FIGURE 1, the differences therein being in the specific components adapting the second embodiment for energization by the alternating current powered D.C. power supply utilized therein.

In addition, the third diode D3 provides and assures sufficient emitter bias for the fourth transistor Q4 such that the third transistor Q3 will be permitted to achieve saturation during a reset cycle of the quantizing capacitance means C1A.

Further, the fourth diode D4 provides reverse voltage transient suppression for the output stage to protect the fifth transistor Q5 from the reverse voltage effects of the inductive load ZL.

As can be seen from the foregoing specification and drawings, this invention provides a novel, accurate and versatile direct current integrator circuit which is capable of directly driving an output register.

Without further description it is believed that the advantages of the present invention over the prior art is apparent and while only two embodiments of the same are illustrated, it is to be expressly understood that the invention is not limited thereto as various changes may be made in the combination and arrangement of the parts illustrated, as will now likely appear to others and those skilled in the art. For a definition of the scope or limits of the invention, reference should be had to the appended claims.

What is claimed is:

1. In an integrator circuit providing quantized pulse output in response to a direct current input, said circuit having an input resistance means and direct current nonzero base input signal flowing therethrough, means providing a zero base for said input signal comprising suppression current generating means selectively generating a suppression current in said input resistance means in opposition with said input current signal.

2. The invention defined in claim 1, wherein said suppression current generating means comprises solid state current control means having a current control path therein in series with said input resistance means and variable reference voltage means selectively biasing said solid state means selectively controlling the magnitude of the suppression current generated in said current control path.

3. The invention defined in claim 1, wherein said current generating means comprises a source of direct current bias, voltage regulator means connected across said source and having a constant voltage reference terminal, selectively variable voltage divider means connected across said voltage regulator means at said reference terminal and having a variable tap thereon, transistor means having emitter, base and collector terminals having the emitter and collector terminals thereof connected in series with said input resistance across said source and having the base terminal thereof connected to said variable tap on said voltage divider means.

4. Circuit means for integrating a direct current input signal and deriving a quantized, variable repetition rate pulse output as an indication of the integral of said input signal comprising first and second input terminals; input resistance means connected across said input terminals adapted to have said current input signal flowing therein and provide an input voltage thereacross as a function of the amplitude of said current input signal; current generator means responsive to said input voltage and including input quantizing capacitance means, charging said input quantizing capacitance means at a rate proportional to the amplitude of said input voltage; voltage monitoring means responsive to the voltage across said capacitance means providing a first output signal in response to a predetermined level of charge of said capacitance means representative of a predetermined quantum of input current flow, discharging said capacitance means and maintaining said first output signal until said capacitance means is discharged; first amplifier means having an input terminal receiving said first output signal, including second capacitance means, charging said second capacitance means to a predetermined voltage in response to said first output signal; and second amplifier means responsive to the voltage on said second capacitance means, including a load impedance, generating an output current pulse of predetermined width and amplitude through said load impedance for each occurrence of said predetermined voltage on said second capacitance means, thereby providing one said output current pulse for each quantized charging cycle of said input quantizing capacitance means.

5. The invention defined in claim 4, wherein said input resistance means comprises voltage divider means having a selectively variable tap connection thereon, said tap connection providing said current generator means with a selectively variable response ratio to said input voltage, thereby selectively varying the rate of change of said quantizing capacitance means and correspondingly the repetition rate of said current output pulses in said load impedance.

6. The invention defined in claim 4, wherein said circuit means includes a source of direct current power; and said current generator means further includes transistor means having emitter base and collector terminals, said base terminal receiving said input voltage from said input resistance means and said emitter and collector terminals being in series with said quantizing capacitance means across said source.

7. The invention defined in claim 4, wherein said circuit includes a source of direct current power and reference voltage means energized thereby providing a reference potential circuit node; and wherein said voltage monitoring means comprises bi-stable circuit means having first and second input terminals receiving the voltage across said input quantizing capacitance means and a reference voltage from said reference potential circuit node, respectively, and an output terminal for said first output signal connected with said input terminal of said first amplifier means.

8. The invention defined in claim 7, wherein said bistable circuit means comprises first and second cross-coupled transistor means, said first transistor means being rendered conductive in reponse to predetermined voltage on said input quantizing capacitance means and generating said first output signal and said second transistor means being rendered conductive by said first output signal, providing a discharge path for said input quantizing capacitance means and latching said first transistor means in its conductive state until said quantizing capacitance means is discharged.

9. The invention defined in claim 4, wherein said circuit means includes a source of direct current power; and further wherein said first amplifier means comprises transistor means having emitter, collector and base terminals, said base terminal comprising the said input terminal thereof and said emitter and collector terminals being connected in series with said second capacitance means across said source.

10. The invention defined in claim 4, wherein said circuit means includes a source of direct current power; and further wherein said second amplifier means comprises transistor means having emitter, base and collector terminals, and an input resistance coupling said base terminal with said voltage on said second capacitance means and providing a controlled duration discharge path for said second capacitance means and said emitter and collector terminals being in series with said load impedance across said source.

11. The invention defined in claim 4, wherein said circuit means includes a source of direct current power and voltage regulator means providing reference potential circuit nodes; wherein said current generator means further includes transistor means having emitter, base and collector terminals, said base terminal receiving said input voltage from said input resistance means and said emitter and collector terminals being in series with said quantizing capacitance means across said source; wherein said voltage monitoring means comprises bistable circuit means having first and second input terminal receiving the voltage across said input quantizing capacitance means and a reference voltage from said reference potential circuit node, respectively, and an output terminal for said first output signal connected with the said input terminal of said first amplifier means, said bistable circuit means comprising first and second cross-coupled transistor means, said first transistor means being rendered conductive in response to predetermined voltage on said input quantizing capacitance means and generating said first output signal and said second transistor means being rendered conductive by said first output signal, providing a discharge path for said input quantizing capacitance means and latching said first transistor means in its conductive state until said quantizing capacitance means is discharged; wherein said first amplifier means comprises transistor means having emitter, collector and base terminals, said base terminal comprising the said input terminals thereof and said emitter and collector terminals being connected in series with said second capacitance means across said source; and wherein said second amplifier means comprises transistor means having emitter, base and collector terminals, and an input resistance, said input resistance coupling said base terminal with said voltage on said second capacitance means and providing a controlled duration discharge path for said second capacitance means and said emitter and collector terminals being in series with said load impedance across said source.

12. The invention defined in claim 11, wherein said input resistance means comprises voltage divider means having a selectively variable tap connection thereon, said tap connection providing said current generator means with a selectively variable response ratio to said input voltage, thereby selectively varying the rate of charge of said quantizing capacitance means and correspondingly the repetition rate of said current output pulses in said load impedance.

13. Circuit means for integrating a direct current input signal and deriving a quantized, variable repetition rate pulse output as an indication of the integral of said input signal comprising first and second input terminals; input resistance means connected across said input terminals adapted to have said current input signal flowing therein and provide an input voltage thereacross as a function of the amplitude of said current input signal; current generator means responsive to said input vlotage and including input quantizing capacitance means, charging said input quantizing capacitance means at a rate proportional to the amplitude of said input voltage; voltage monitoring means responsive to the voltage across said capacitance means providing a first output signal in response to a predetermined level of charge of said capacitance means representative of a predetermined quantum of input current flow, discharging said capacitance means and maintaining said first output signal until said capacitance means is discharged; first amplifier means having an input terminal receiving said first output signal, including second capacitance means, charging said second capacitance means to a predetermined voltage in response to said first output signal; second amplifier means responsive to the voltage on said second capacitance means, including a load impedance, generating an output current pulse of predetermined width and amplitude through said load impedance for each occurrence of said predetermined voltage on said second capacitance means, thereby providing one said output current pulse for each quantized charging cycle of said input quantizing capacitance means; and means providing a zero base for said input signal comprising suppression current generating means selectively generating a suppression current in said input resistance means in opposition with said input current signal.

14. The invention defined in claim 13, wherein said suppression current generating means comprises solid state current control means having a current control path therein in series with said input resistance means and variable reference voltage means selectively, biasing said solid state means selectively controlling the magnitude of the suppression current generated in said current control path.

15. The invention defined in claim 13, wherein said current generating means comprises a source of direct current bias, voltage regulator means connected across said source and having a constant voltage reference terminal, selectively variable voltage divider means connected across said voltage regulator means at said reference terminal and having a variable tap thereon, transistor means having emitter, base and collector terminals having the emitter and collector terminals thereof connected in series with said input resistance across said source and having the base terminal thereof connected to said variable tap on said voltage divider means.

16. The invention defined in claim 13, wherein said input resistance means comprises voltage divider means having a selectively variable tap connection thereon, said tap connection providing said current generator means with a selectively variable response ratio to said input voltage, thereby selectively varying the rate of charge of said quantizing capacitance means and correspondingly the repetition rate of said current output pulses in said load impedance.

17. The invention defined in claim 13, wherein said circuit means includes a source of direct current power; and said current generator means further includes transistor means having emitter base and collector terminals, said base terminal receiving said input voltage from said input resistance means and said emitter and collector terminals being in series with said quantizing capacitance means across said source.

18. The invention defined in claim 13, wherein said circuit includes a source of direct current power and reference voltage means energized thereby providing a reference potential circuit node; and wherein said voltage monitoring means comprises bistable circuit means having first and second input terminal receiving the voltage across said input quantizing capacitance means and a reference voltage from said reference potential circuit node, respectively, and an output terminal for said first output signal connected with the said input terminal of said first amplifier means.

19. The invention defined in claim 13, wherein said bistable circuit means comprises first and second cross-coupled transistor means, said first transistor means being rendered conductive in response to predetermined voltage on said input quantizing capacitance means and generating said first output signal and said second transistor means being rendered conductive by said first output signal, providing a discharge path for said input quantizing capacitance means and latching said first transistor means in its conductive state until said quantizing capacitance means is discharged.

20. The invention defined in claim 13, wherein said circuit means includes a source of direct current power; and further wherein said first amplifier means comprises transistor means having emitter, collector and base terminals, said base terminal comprising the said input terminal thereof and said emitter and collector terminals being connected in series with said second capacitance means across said source.

21. The invention defined in claim 13, wherein said circuit means includes a source of direct current power; and further wherein said second amplifier means comprises transistor means having emitter, base and collector terminals, and an input resistance, said input resistance coupling said base terminal with said voltage on said second capacitance means and providing a controlled duration discharge path for said second capacitance means and said emitter and collector terminals being in series with said load impedance across said source.

22. The invention defined in claim 13, wherein said circuit means includes a source of direct current power and voltage regulator means providing reference potential circuit nodes; wherein said current generator means further includes transistor means having emitter, base and collector terminals, said base terminal receiving said input voltage from said input resistance means and said emitter and collector terminals being in series with said quantizing capacitance means across said source; wherein said voltage monitoring means comprises bistable circuit means having first and second input terminal receiving the voltage across said input quantizing capacitance means and a reference voltage from said reference potential circuit node, respectively, and an output terminal for said first output signal connected with said input terminal of said first amplifier means, said bistable circuit means comprising first and second cross-coupled transistor means, said first transistor means being rendered conductive in response to predetermined voltage on said input quantizing capacitance means and generating said first output signal and said second transistor means being rendered conductive by said first output signal, providing a discharge path for said input quantizing capacitance means and latching said first transistor means in its conductive state until said quantizing capacitance means is discharged; wherein said first amplifier means comprises transistor means having emitter, collector and base terminals, said base terminal comprising the said input terminal thereof and said emitter and collector terminals being connected in series with said second capacitance means across said source; and wherein said second amplifier means comprises transistor means having emitter, base and collector terminals, and an input resistance, said input resistance coupling said base terminal with said voltage on said second capacitance means and providing a controlled duration discharge path for said second capacitance means and said emitter and collector terminals being in series with said load impedance across said source.

23. The invention defined in claim 22, wherein said input resistance means comprises voltage divider means having a selectively variable tap connection thereon, said tap connection providing said current generator means with a selectively variable response ratio to said input voltage, thereby selectively varying the rate of change of said quantizing capacitance means and correspondingly the repetition rate of said current output pulses in said load impedance.

24. Circuit means for integrating a direct current input signal and deriving a quantized, variable repetition rate pulse output as an indication of the integral of said input signal comprising input terminals; input means receiving a current input signal and converting same to a functionally related input voltage connected at said input terminals; current generator means responsive to said input voltage and including input quantizing capacitance means, charging said input quantizing capacitance means at a rate proportional to the amplitude of said input voltage; voltage monitoring means responsive to the voltage across said capacitance means providing a first output signal in response to a predetermined level of charge of said capacitance means representative of a predetermined quantum of input current flow, discharging said capacitance means and maintaining said first output signal until said capacitance means is discharged; first amplifier means having an input terminal receiving said first output signal, and providing an intermediate output signal in response to said first output signal; and second amplifier means responsive to said intermediate output signal, including a load impedance, generating an output current pulse of predetermined width and amplitude through said load impedance for each occurrence of said intermediate output signal, thereby providing one said output current pulse for each quantized charging cycle of said input quantizing capacitance means.

25. The invention defined in claim 24, wherein said circuit means further includes means providing a zero base for said input signal comprising suppression current generating means selectively generating a suppression current in said input means in opposition with said input current signal.

26. Circuit means for integrating a direct current input signal and deriving a quantized, variable repetition rate pulse output as an indication of the integral of said input signal comprising input terminals; input means receiving a current input signal and converting same to a functionally related input voltage connected at said input terminals; current generator means responsive to said input voltage and including input quantizing capacitance means, charging said input quantizing capacitance means at a rate proportional to the amplitude of said input voltage; voltage monitoring means responsive to the voltage across said capacitance means providing a first output signal in response to a predetermined level of charge of said capacitance means representative of a predetermined quantum of input current flow, discharging said capacitance means and maintaining said first output signal until said capacitance means is discharged; and amplifier means having an input terminal receiving said first output signal and including a load impedance, generating an output current pulse in said load impedance in response to such occurrence of said first output signal, said output current pulse being of a predetermined width and amplitude, thereby providing one output current pulse for each quantized charging cycle of said input quantizing capacitance means.

27. The invention defined in claim 26, wherein said circuit means further includes means providing a zero base for said input signal comprising suppression current generating means selectively generating a suppression current in said input means in opposition with said input current signal.

References Cited

UNITED STATES PATENTS

| | | | |
|---|---|---|---|
| 2,984,788 | 5/1961 | Korff et al. | 328—162 X |
| 3,281,717 | 10/1966 | Wannamaker | 331—131 |

ARTHUR GAUSS, *Primary Examiner.*

S. D. MILLER, *Assistant Examiner.*